United States Patent

Araki et al.

[11] Patent Number: 5,156,908
[45] Date of Patent: Oct. 20, 1992

[54] MAGNETIC RECORDING MEDIUM AND METHOD FOR PRODUCING THE SAME

[75] Inventors: Hiroaki Araki; Kenichi Yoden, both of Kanagawa, Japan

[73] Assignee: Fuji Photo Film Co., Ltd., Kanagawa, Japan

[21] Appl. No.: 689,587

[22] Filed: Apr. 19, 1991

[30] Foreign Application Priority Data

Apr. 20, 1990 [JP] Japan .................. 2-103096

[51] Int. Cl.$^5$ ............................. G11B 23/00
[52] U.S. Cl. ....................... 428/323; 428/329; 428/425.9; 428/694; 428/900; 427/128; 427/131
[58] Field of Search ............ 428/323, 329, 694, 425.9, 428/900; 427/128, 131

[56] References Cited

U.S. PATENT DOCUMENTS

| | | | |
|---|---|---|---|
| 4,442,159 | 4/1984 | Dezawa et al. | 428/900 |
| 4,624,883 | 11/1986 | Yamaguchi et al. | 428/694 |
| 4,624,894 | 11/1986 | Kishimoto et al. | 428/328 |
| 4,643,941 | 2/1987 | Miyoshi et al. | 428/900 |
| 4,911,997 | 3/1990 | Asai et al. | 428/694 |
| 4,980,230 | 12/1990 | Saito et al. | 428/329 |

Primary Examiner—Paul J. Thibodeau
Assistant Examiner—Leszek Kiliman
Attorney, Agent, or Firm—Sughrue, Mion, Zinn, Macpeak & Seas

[57] ABSTRACT

A magnetic recording medium improved in reproduced output over a wide wavelength region, and methods for producing the same are disclosed, the magnetic recording medium having at least two magnetic layers each containing ferromagnetic powders dispersed in binders, which medium comprises a lower magnetic layer containing an acicular ferromagnetic powder having a coercive force of 600 to 2,000 Oe and an upper magnetic layer containing a plate-shaped ferromagnetic alloy powder having a coercive force of 1,000 to 5,000 Oe, a saturation magnetization of 90 to 150 emu/g and an axis easily magnetizable vertically to a plate surface.

8 Claims, 1 Drawing Sheet

MAGNETIC RECORDING MEDIUM AND METHOD FOR PRODUCING THE SAME

FIELD OF THE INVENTION

The present invention relates to a magnetic recording medium and methods for producing the same, and, more particularly, to a magnetic recording medium high in reproduced output and satisfactory in running durability over a wide wavelength region extending from a short wavelength to a long wavelength and a method for producing the same.

BACKGROUND OF THE INVENTION

Heretofore, magnetic recording media have been widely used for magnetic recording and reproduction which comprise non-magnetic supports and magnetic coatings applied thereto. The magnetic coatings contain ferromagnetic powders formed of needle crystals such as Co-containing magnetic iron oxide and $CrO_2$ dispersed in binders.

Recently, there have been strong demands for improvements in recording density, and, as one proposal, conventional Co-containing magnetic iron oxide has also been divided more finely in efforts to achieve this object. This is, however, still insufficient to improve reproduced outputs of short wavelengths in high frequency regions. Magnetic layers using ferromagnetic alloy powders are considerably improved in reproduced output. However, when the magnetic layers using only ferromagnetic alloy powders are employed, there is the disadvantage that it is difficult to obtain adequate running durability.

In particular, a plate-like ferromagnetic hexagonal ferrite powder has recently been developed. Magnetic recording media using this ferromagnetic powder have the disadvantage that while the outputs of the short wavelengths on the high frequency side are high, the outputs of long wavelengths on the low frequency side is low.

In order to overcome these disadvantages, it was proposed to allow for a ferromagnetic barium-ferrite powder and a ferromagnetic $\gamma$-$Fe_2O_3$ powder to coexist (JP-A-57-212623, the term "JP-A" as used herein means an "unexamined published Japanese patent application"). However, it was difficult to obtain higher output by this method.

Further, the present inventors produced magnetic tapes by using the ferromagnetic alloy powder and the ferromagnetic hexagonal ferrite powder which were mixed with each other. However, no substantial improvement in reproduced output was observed.

In a system utilizing a wide band extending a low band to a high band, such as in video tape, a plural-magnetic layer structure is considered to be advantageous. Previously, various layer structures have been proposed. Namely, the output of the overall band can be improved by giving high band characteristics to an upper layer and giving low band characteristics to a lower layer.

In particular, in order to raise the reproduced output in the high frequency region, it is proposed to use acicular ferromagnetic oxide powders such as iron oxide Co-containing iron oxide and $CrO_2$, and ferromagnetic acicular metal or alloy powders mainly comprising iron and having high coercive force and high saturation magnetization, as magnetic substances used in the upper magnetic layer. However, the ferromagnetic acicular metal or alloy powders utilize longitudinal magnetizing components, and therefore a significant decrease in reproduced output is encountered in the high frequency region, namely, in the short wavelength region in recording (for example, a wavelength of 0.5 $\mu$m or less).

It is further proposed to use hexagonal ferromagnetic magnetoplumbite-ferrite powders such as barium-ferrite, as magnetic substances used in the upper magnetic layer (for example, JP-A-57-195329 and JP-A-60-223018).

The hexagonal ferromagnetic ferrite powders can utilize vertically magnetizable components. It is therefore believed that the characteristics thereof are superior to those afforded by the ferromagnetic acicular metal or alloy powders. Actually, the output at a recording wavelength of 0.5 $\mu$m for these powders does exceed that of the acicular metal or alloy powders. However, the improvement still is not considered sufficient. Moreover, even when the thickness and magnetic characteristics of the plural-layer structure are suitably selected, the output in the recording wavelength region of about 1 to 4 $\mu$m is not as excellent as compared to that of a single- or plural-layer tape using the ferromagnetic acicular metal or alloy powder.

SUMMARY OF THE INVENTION

It is therefore an object of the present invention to provide a magnetic recording medium improved in reproduced output of an overall frequency band and excellent in electromagnetic characteristics.

The above-described object of the present invention can be attained by the present invention hereinafter described.

Namely, the present invention provides a magnetic recording medium comprising at least two magnetic layers each containing ferromagnetic powders dispersed in binders, wherein said medium comprises a lower magnetic layer containing an acicular ferromagnetic powder having a coercive force of 600 to 2,000 Oe and an upper magnetic layer containing a plate-like, i.e., plate-shaped, ferromagnetic alloy powder having a coercive force of 1,000 to 5,000 Oe, a saturation magnetization of 90 to 150 emu/g and an axis of easy magnetization vertically to a plate surface.

The present invention further provides a method for producing a magnetic recording medium which comprises applying a first magnetic coating containing an acicular ferromagnetic powder having a coercive force of 600 to 2,000 Oe and a polyurethane binder having a weight-average molecular weight of 10,000 to 40,000 to form a lower magnetic layer; applying a second magnetic coating to said lower magnetic layer simultaneously with or subsequent to formation of said lower layer to form an upper magnetic layer, and said second magnetic coating containing a plate-like ferromagnetic alloy powder having a coercive force of 1,000 to 5,000 Oe, a saturation magnetization of 90 to 150 emu/g and an axis of easy magnetization vertically to a plate surface, a vinyl chloride copolymer having a degree of polymerization as low as 250 to 350 and containing at least one polar group selected from the group consisting of —$SO_3M$, —$OSO_3M$, —$PO_3M_2$ and —$OPO_3M_2$ (wherein M represents a hydrogen atom, an alkali metal or ammonium) and a polyurethane having a weight-average molecular weight of 30,000 to 70,000; then vertically orientating the ferromagnetic alloy powder contained in the upper magnetic layer by applying a magnetic field of 3,000 to 20,000 Oe vertically thereto; and thereafter orientating the acicular ferromagnetic powder contained in the lower magnetic layer longitudinally by applying a magnetic field of 3,000 Oe or less longitudinally thereto.

Furthermore, the present invention also provides a method for producing a first magnetic recording medium which comprises applying a magnetic coating containing an acicular ferromagnetic powder having a coercive force of 600 to 2,000 Oe and an unsaturated bond-containing compound as a binder to form a lower magnetic layer, said unsaturated bond-containing compound being crosslinkable or polymerizable by radiation exposure and having a weight-average molecular weight of 30,000 or less; applying a second magnetic coating to said lower magnetic layer simultaneously with or subsequent to formation of said lower layer to form an upper magnetic layer, and said second magnetic coating containing a plate-like ferromagnetic alloy powder having a coercive force of 1,000 to 5,000 Oe, a saturation magnetization of 90 to 150 emu/g and an axis of easy magnetization vertically to a plate surface, a vinyl chloride copolymer having a degree of polymerization as low as 250 to 350 and at least one polar group selected from the group consisting of $-SO_3M$, $-O-SO_3M$, $-PO_3M_2$ and $-OPO_3M_2$ (wherein M represents a hydrogen atom, an alkali metal or ammonium) and a polyurethane having a weight-average molecular weight of 30,000 to 70,000; then hardening the lower magnetic layer by radiation exposure during or after applying a magnetic field of 3,000 Oe or less longitudinally; and thereafter heating the upper magnetic layer during or after applying a magnetic field in a range of from the intensity of the magnetic field applied to said lower magnetic layer to 20,000 Oe or less to orientate and harden said ferromagnetic alloy powder vertically.

DETAILED DESCRIPTION OF THE INVENTION

Figure 1:
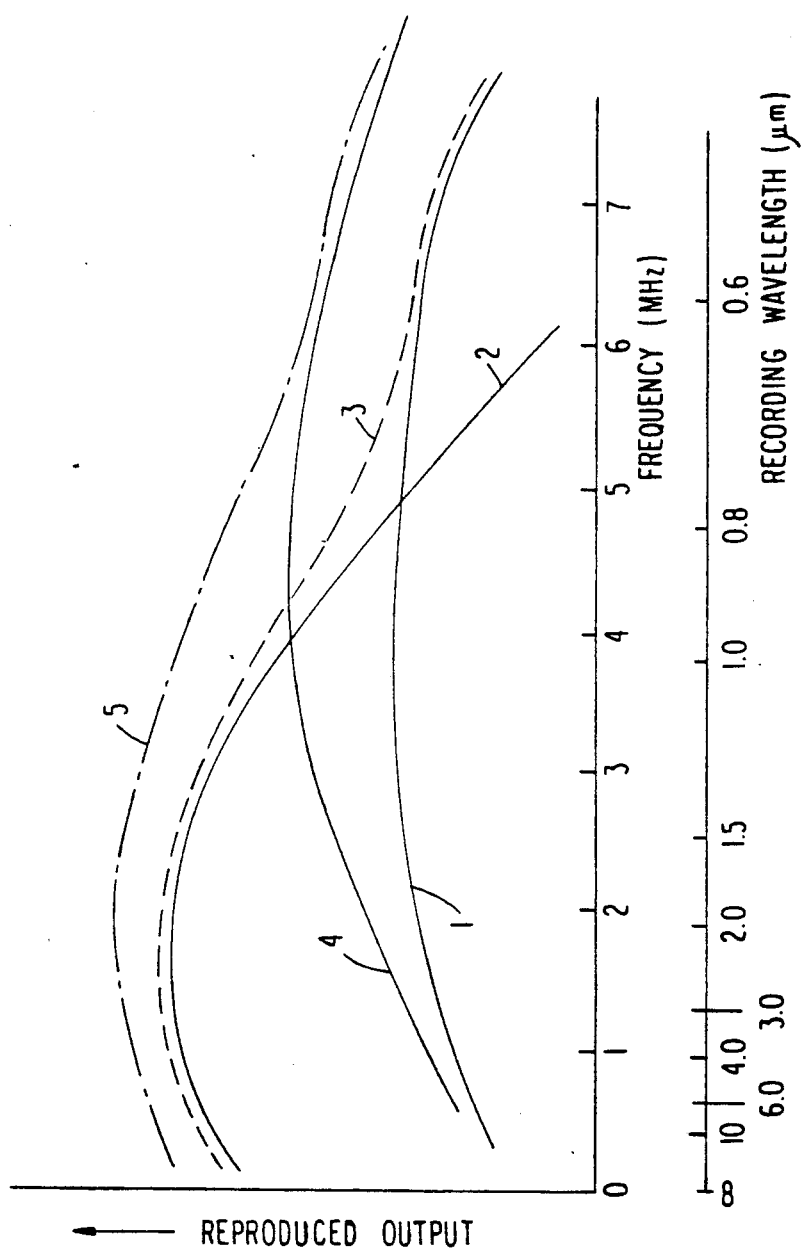
FIG. 1 is a graph showing frequency characteristics of a magnetic recording media of the present invention and prior-art magnetic recording media, in which the relation between frequency and recording wavelength is typified by an 8 mm, hi-8 system.

In the present invention, the lower magnetic layer of the plural-layer structure contains the acicular ferromagnetic powder, and the upper magnetic layer contains the plate-like ferromagnetic alloy powder having the axis of easy magnetization vertically to the plate surface, whereby the electromagnetic characteristics in the overall frequency band are more improved than when barium-ferrite is used in the upper magnetic layer.

Namely, by using the plate-like ferromagnetic alloy powder having the axis of easy magnetization vertically to the plate surface, the saturation magnetization ($\sigma s$) can be significantly improved as compared to the case of barium-ferrite.

For example, a graph is obtained which shows the frequency characteristics (f characteristics) of the upper magnetic layer, the lower magnetic layer and the plural-layer structure comprising the upper and lower magnetic layers as shown in FIG. 1, to compare the magnetic recording media of the present invention with conventional ones. Namely, an improvement in reproduced output is observed in the region of a high frequency, such as 7 MHz, by replacing the upper barium ferrite-containing layer (1) with the upper plate-like ferromagnetic alloy powder containing layer (4) of the present invention. An improvement in reproduced output is also observed in the intermediate frequency region of 3 to 5 MHz. Further, the plural-layer structure (5) having the acicular ferromagnetic powder containing layer as the lower magnetic layer (2) and the plate-like ferromagnetic alloy powder containing layer as the upper magnetic layer (4) is improved in reproduced output over the overall frequency band, as compared to the conventional plural-layer structure (3) having the upper magnetic layer (1) and the lower magnetic layer (2). The plate-like ferromagnetic alloy powder having the axis of easy magnetization vertically to the plate surface has the following disadvantage when used alone as a single layer structure. Namely, if the magnetic layer is thick, the ferromagnetic alloy powder easily aggregates due to its high saturation magnetization ($\sigma s$). The resulting aggregate is integrated in a thickness direction, which causes significant deterioration of the surface properties of the magnetic layer. For this reason, sufficient reproduced output can not be obtained in the region of a high frequency, such as 7 MHz, due to spacing loss.

However, when the magnetic layer of the plural-layer structure is employed as the present invention, the thickness of the upper layer can be reduced. Consequently, the problem of integration of the aggregate in the thickness direction does not occur, and therefore a magnetic layer having good surface properties can be obtained.

The plate-like shape of the ferromagnetic alloy powder used in the upper magnetic layer of the present invention is described in greater detail as follows. Namely, when the plate ratio is taken as $\phi/t$, it is suitably selected from the range of $\phi/t \geq 1$, wherein $\phi$ represents the grain size of 0.5 μm or less and t represents the plate thickness of 0.5 μm or less. Further, it is preferred that the plate-like ferromagnetic alloy powder has a specific surface area ($S_{BET}$) of 20 m²/g or more and preferably 35 m²/g or more, which is measured by the BET method.

The shapes of the plate-like ferromagnetic alloy powders used in the present invention include spherical and ellipsoidal shapes.

The magnetic recording medium of the present invention is produced by magnetically orientating the ferromagnetic alloy powder contained in the upper layer vertically and the acicular ferromagnetic powder contained in the lower layer longitudinally. In the present invention, the methods are not particularly limited, as long as the above-described orientation is achieved.

In general, when a plate-like ferromagnetic powder having magnetic anisotropy vertically to a plate surface is applied and dried, the powder is orientated to some extent vertical direction even if the orientation by the imposition of a magnetic field is not carried out. For this reason, a desired vertical orientation, to some extent, can be obtained without the need for orientation by the magnetic field, as another embodiment of the present invention. However, the effect of the present invention can be accentuated by orientation with the application of the magnetic field.

Methods for effecting the orientation are not particularly limited, and can be carried out by combinations of varying the timing (e.g., during or after application of the magnetic coating composition, or during or after drying) of the orientation and varying the magnetic layers (the upper layer alone/the lower layer alone/-both layers of the upper and lower layers) to which the magnetic field is applied.

For this reason, in the present invention, the above-described orientation can be achieved by suitably selecting the time when the upper and lower magnetic layers are hardened and the timing of when the magnetic field is applied, as well as the kinds of binders contained in the upper and lower magnetic layers and the molecular weights thereof. In the present invention, low molecular weight compounds which can react with polymers to be integrated, such as crosslinking agents, are considered to be suitable binders.

In the present invention, the lower magnetic layer means a layer having the acicular ferromagnetic powder orientated longitudinally, namely, a layer formed in a position nearer to a surface of a non-magnetic support than the upper magnetic layer, i.e., the layer having the plate-like ferromagnetic alloy powder orientated vertically. The lower magnetic layer and the upper magnetic layer are typically formed directly in contact with each other. However, a magnetic layer having a ferromagnetic powder orientated in any direction may be formed between the lower magnetic layer and the upper magnetic layer. Also, a non-magnetic layer having no ferromagnetic powder may be formed in any location including as a back layer formed on the side opposite to the side on which the magnetic layer is formed. Further, the magnetic layers of the present invention may be formed on both sides of the non-magnetic support.

The plate-like ferromagnetic alloy powders used in the upper magnetic layer in the present invention are not particularly limited, as long as they satisfy the above-described requirements. Examples thereof include the following powders:

(1) Ferromagnetic hexagonal alloy powders comprising Co as a main component and another metal, such as Co-Cr and Co-Ni (2) Ferromagnetic alloy powders of 3d transition metals-4f transition metals, such as $SmCo_5$ and $PrCo_5$ These powders may be used alone or in combination.

Methods for producing such ferromagnetic alloy powders are not particularly limited. Examples thereof include the following methods:

(1) The method of reducing salts such as metal chlorides and sulfates in aqueous solutions by using reducing agents such as sodium borohydride and hypophosphites (JP-A-59-170209)

(2) The method of heating plate-like metal oxides, hydroxides or oxyhydroxides in reducing gases such as hydrogen (JP-A-59-173207 and JP-A-60-100606)

(3) The method of evaporating alloys such as Co-Ni, Co-Cr and Sm-Co in low pressure inert gases, followed by recrystallization It is necessary that these plate-like ferromagnetic alloy powders have a coercive force (Hc) of 1,000 to 5,000 Oe and a saturation magnetization ($\sigma s$) of 90 to 150 emu/g. If the coercive force (Hc) is less than 1,000 Oe, the reproduced output in the high frequency region becomes inadequate. If the coercive force (Hc) exceeds 5,000 Oe, recording and reproducing by using normal heads become extremely difficult.

If the saturation magnetization ($\sigma s$) is less than 90 emu/g, the reproduced output in the high frequency region becomes insufficient and, as a result, the advantage over hexagonal ferrite is lost. If the saturation magnetization ($\sigma s$) exceeds 150 emu/g, the oxidation stability of the ferromagnetic powders becomes extremely deteriorated.

The acicular ferromagnetic powder used in the lower magnetic layer in the present invention means any ferromagnetic powder having an acicular ratio of 3 to 15. Preferred examples thereof include Co-containing iron oxide, $CrO_2$, $CrO_2$ and Fe-Ni alloys.

The acicular ratio is defined as (a length in the long axis)/(a length in the short axis), and its preferred range is 3 to 15 as described above. The length in the long axis is preferably 0.5 $\mu$m or less, and more preferably 0.3 $\mu$m or less. Further, the specific surface area ($S_{BET}$) is 25 $m^2/g$ or more, and preferably 35 $m^2/g$ or more.

It is preferred that the acicular ferromagnetic powders used in the present invention have a coercive force (Hc) of 600 to 1,000 Oe.

In the magnetic recording media of the present invention, it is preferred that the lower magnetic layer or layers have a residual magnetic flux density (Br) of 1,200 to 3,500 gausses, particularly 1,500 to 2,500 gausses and the upper magnetic layer or layers have a residual magnetic flux density (Br) of 2,000 to 3,500 gausses, particularly 2,200 to 3,300 gausses by employing the above-described ferromagnetic powders. If the residual magnetic flux density (Br) is below the above layer range limits, the reproduced output is reduced in each band. In order to increase the residual magnetic flux density (Br) to a magnitude higher than the above lower range limits, the methods of (1) using ferromagnetic powders inferior in oxidation stability, (2) reducing the amount of the binders contained in the magnetic layers, and (3) reducing the amount of non-magnetic powders (such as carbon black and abrasive agents) contained in the magnetic layers can be employed. However, it is understood that all of these methods have the drawback of unfavorably deteriorating shelf life and durability.

It is preferred that both of the upper and lower layers have a residual magnetic flux density (Br) of 3,500 gausses or less.

The methods of producing the magnetic recording medium of the present invention may be divided into two broad classes. The first method is a method in which the orientation of the lower magnetic layer is carried out after the orientation of the upper magnetic layer is completed, and the second method is a method in which, conversely, the orientation of the upper magnetic layer is carried out after the orientation of the lower magnetic layer is completed. In each method, the binder composition and hardening means are independently selected for each magnetic layer.

The binders used in the present invention may be any of known thermoplastic resins, thermosetting resins, radiation curable resins, reactive resins and mixtures thereof, which have been customarily used as the binders for magnetic recording media.

The above thermoplastic resins include acrylic ester-acrylonitrile copolymers, acrylic ester-vinylidene chloride copolymers, acrylic ester-styrene copolymers, methacrylic ester-acrylonitrile copolymers, methacrylic ester-vinylidene chloride copolymers, methacrylic ester-styrene copolymers, vinyl chloride copolymers (details are described hereinafter), polyurethane resins (details are described hereinafter), urethane elastomers, nylon-silicone resins, nitrocellulose-polyamide resins, polyvinyl fluoride, vinylidene chloride-acrylonitrile copolymers, butadiene-acrylonitrile copolymers, polyamide resins, polyvinyl butyral, cellulose derivatives (such as cellulose acetate butyrate, cellulose diacetate, cellulose triacetate, cellulose propionate and nitrocellulose), styrene-butadiene copolymers, polyester resins, chlorovinyl ether-acrylic ester copolymers, and amino resins.

The above thermosetting resins or reactive resins are resins which have a weight-average molecular weight of 200,000 or less in the coating solution state, and whose molecular weight is significantly increased by heating after coating and drying. Examples of such resins include phenolic resins, phenoxy resins, epoxy resins, curable-type polyurethane resins, urea resins, melamine resins, alkyd resins, silicone resins, reactive acrylic resins, epoxy-polyamide resins, nitrocellulose-melamine resins, mixtures of high molecular weight polyester resins and isocyanate prepolymers, mixtures of methacrylate copolymers and diisocyanate prepolymers, mixtures of polyester polyols and polyisocyanates, urea-formaldehyde resins, mixtures of polyisocyanates such as low molecular weight glycols/high molecular weight diols/triphenylmethane triisocyanate, polyamine resins, polyimine resins and mixtures thereof.

Further, as the radiation curable resins, there can be used resins containing at least one carbon-carbon unsaturated bond curable by irradiation of radiation, in their molecule. Examples of the radiation curable resins include resins produced by introducing compounds containing at least one carbon-carbon unsaturated bond in their molecule into the above-described vinyl chloride copolymers or polyurethane resins, using the compounds having the carbon-carbon unsaturated bond as comonomers in a copolymerization, or reacting the compounds with the above-described thermoplastic or thermosetting copolymers or resins.

As the compounds containing at least one carbon-carbon unsaturated bond in their molecule, compounds containing at least one (meth)acryloyl group in their molecule are preferably used. Such compounds may further contain glycidyl groups or hydroxyl groups.

Furthermore, other compounds polymerizable by radiation exposure which may be added to the above-described binders include (meth)acrylic esters, (meth)acrylic amides, allyl compounds, vinyl ethers, vinyl esters, vinyl heterocyclic compounds, N-vinyl compounds, styrenic compounds, (meth)acrylic acid, crotonic compounds, itaconic compounds and olefins. Of the radiation curable compounds, particularly preferred compounds include compounds containing at least two (meth)acryloyl groups in one molecule such as diethylene glycol di(meth)acrylate, triethylene glycol di(meth)acrylate, trimethylolpropane tri(meth)acrylate, pentaerythritol tetra(meth)acrylate and reaction products of polyisocyanates and poly(meth)acrylate.

The vinyl chloride copolymers used in the present invention can be selected from copolymers having a softening temperature of 150° C. or less, preferably 0° C. to 100° C. and a weight-average molecular weight of about 10,000 to 300,000, preferably about 50,000 to 200,000.

Specific examples of the preferred vinyl chloride copolymers include vinyl chloride-vinyl acetate copolymers, vinyl chloride-vinyl acetate-maleic acid copolymers, vinyl chloride-vinyl acetate-vinyl alcohol copolymers, vinyl chloride-vinyl acetate-maleic acid-vinyl alcohol copolymers, vinyl chloride-vinyl propionate-vinyl alcohol copolymers, vinyl chloride-vinyl acetate-acrylic acid copolymers, vinyl chloride-vinyl acetate-acrylic acid-vinyl alcohol copolymers and oxides of these copolymers.

In particular, the vinyl chloride copolymers containing polar groups such as carboxyl groups or salts thereof, sulfonic groups or salts thereof, phosphoric groups or salts thereof, amino groups and hydroxyl groups are preferable for providing an improvement in dispersibility of the ferromagnetic powders.

As the above-described polyurethanes, polyurethanes can be used which are produced from polyols such as polyether polyols and polyester polyols, diisocyanates and chain extenders as needed, by methods known in the art.

Examples of the above polyols include compounds such as polyetherdiols, polyesterdiols, polycarbonatediols and polycaprolactonediols.

Typical examples of the above polyetherpolyols include polyalkylene glycol such as polyethylene glycol and polypropylene glycol.

The above polyesterpolyols can be synthesized, for example, by polycondensation of dihydric alcohols and dibasic acids or by ring-opening polymerization of lactones such as caprolactone. The typical dihydric alcohols are exemplified by glycols such as ethylene glycol, propylene glycol, butanediol, 1,6-hexanediol and cyclohexanedimethanol. Further, the typical dibasic acids are exemplified by adipic acid, pimelic acid, azelaic acid, sebacic acid, phthalic acid and terephthalic acid.

Furthermore, the polycarbonatepolyols include, for example, polycarbonatepolyols having a weight-average molecular weight of 300 to 20,000 and a hydroxyl value of 20 to 300, which are synthesized by condensation or ester interchange of polyhydric alcohols represented by the following general formula (I) and phosgene, chloroformic esters, dialkyl carbonates or diaryl carbonates:

$$HO-R^1-OH \quad (I)$$

wherein $R^1$ represents, for example, $(CH_2)_n$ (n=3-14),

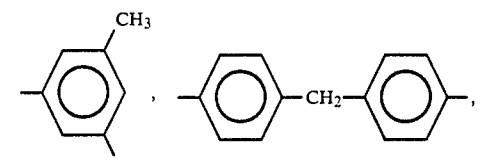

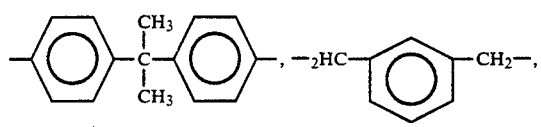

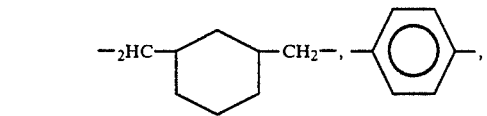

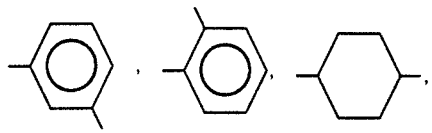

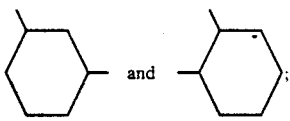

and the polycarbonatepolyols also include polycarbonate polyesterpolyols having a weight-average molecular weight of 400 to 30,000 and a hydroxyl value of 5 to 300, which are obtained by condensation of the above polycarbonatepolyols and divalent carboxylic acids represented by the following general formula (II):

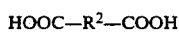   (II)

wherein $R^2$ represents, for example, an alkylene group having 3 to 6 carbon atoms, a 1,4-, 1,3- or 1,2-phenylene group, or a 1,4-, 1,3- or 1,2-cyclohexylene group.

Other polyols such as polyester-etherpolyols may be incorporated in the above polyols in an amount of not more than 90% by weight of the above polyols so as to use them in combination with the above polyols.

The polyisocyanates used for obtaining the polyurethanes by reaction with the above polyols are not particularly limited. Polyisocyanates usually employed in the field can be used. Examples of such polyisocyanates include hexamethylene diisocyanate, tolidine diisocyanate, isophorone diisocyanate, 1,3-xylylene diisocyanate, 1,4-xylylene diisocyanate, cyclohexanediisocyanate, toluidine diisocyanate, 2,4-tolylene diisocyanate, 2,6-tolylene diisocyanate, 4,4'-diphenylmethane diisocyanate, p-phenylene diisocyanate, m-phenylene diisocyanate, 1,5-naphthylene diisocyanate, 3,3-dimethylphenylene diisocyanate and dicyclohexylmethane diisocyanate.

The chain extenders used include, for example, the above-described polyhydric alcohols, aliphatic polyamines, alicyclic polyamines and aromatic polyamines.

The above-described polyurethanes may contain polar groups such as $-COOM$, $-SO_3M$, $-OPO_3M_2$ and $-OM$ (wherein M represents a hydrogen atom, sodium or potassium).

The above binders may further contain compounds (polyisocyanates) having at least two isocyanate groups. Examples of such polyisocyanates include isocyanates such as tolylene diisocyanate, 4,4'-diphenylmethane diisocyanate, hexamethylene diisocyanate, xylylene diisocyanate, naphthylene-1,5- diisocyanate, o-toluidine diisocyanate, isophorone diisocyanate and triphenylmethane triisocyanate; reaction products of these isocyanates with polyols; and polyisocyanates formed by condensation of these isocyanates.

The above-described isocyanates are commercially available under the trade names of Coronate L, Coronate HL, Coronate H, Coronate EH, Coronate 2030, Coronate 2031, Coronate 2036, Coronate 3015, Coronate 3041, Coronate 2014, Millionate MR, Millionate MTL, Daltosec 1350, Daltosec 2170 and Daltosec 2280 (manufactured by Nippon Polyurethane Industry Co., Ltd.); Takenate D-102, Takenate D-110N, Takenate D-200 and Takenate D-202 (manufactured by Takeda Chemical Industries, Ltd.); Sumidule N75 (manufactured by Sumitomo Bayer Co., Ltd.); Desmodule L, Desmodule IL. Desmodule N and Desmodule HL (manufactured by Bayer, West Germany); and Burnock D850 and Burnock D802 (manufactured by Dainippon Ink and Chemicals, Inc.).

The compounding ratio of the binder to the ferromagnetic powder in either the upper or lower magnetic layer of the magnetic recording medium of the present invention is preferably 10 to 30 parts by weight per 100 parts by weight of the ferromagnetic powder.

The binder compositions for the upper magnetic layer used in the above-mentioned first method of the preferred two methods for producing the magnetic recording media of the present invention include, for example, a resin composition containing 35 to 80% by weight of a vinyl chloride copolymer having a degree of polymerization as low as 250 to 350 and at least one polar group selected from the group consisting of $-SO_3M$, $-OSO_3M$, $-PO_3M_2$ and $-OPO_3M_2$ (wherein M represents a hydrogen atom, an alkali metal or ammonium) in an amount of $1 \times 10^{-7}$ to $1 \times 10^{-3}$ equivalent/g of copolymer, 15 to 50% by weight of a polyurethane having a weight-average molecular weight of 30,000 to 70,000, and 5 to 50% by weight of the other components, per the total weight of the binder. The binder compositions for the lower magnetic layer include, for example, a resin composition containing 15 to 50% by weight of a polyurethane having a weight-average molecular weight of 10,000 to 40,000. Also, in this and other embodiments of the present invention, either the upper or lower magnetic layer can comprise either a single or multi-layer arrangement.

The ferromagnetic alloy powder used in the upper magnetic layer in the present invention has the axis of easy magnetization vertically to the plate surface and is high in saturation magnetization ($\sigma$s), so that the particles easily aggregate. Furthermore, since the particles are plate-like, they are easily accumulated.

However, when the vinyl chloride copolymer having a relatively low degree of polymerization is used as described above, the mobility of the binder in the magnetic coating is enhanced, and the chance that the binder comes into contact with the ferromagnetic alloy powder increases therewith, whereby the adsorptivity is heightened and the dispersibility is significantly improved.

In the low molecular weight polymers, the ratio of the polar group to the whole molecule can be increased. The low molecular weight polymers are therefore high in adsorptivity and convenient to disperse the ferromagnetic alloy powder.

In order to orientate the acicular ferromagnetic powder contained in the lower magnetic layer longitudinally and the ferromagnetic alloy powder contained in the upper magnetic layer vertically, a vertically strong magnetic field of 3,000 to 20,000 Oe, preferably 5,000 to 10,000 Oe is first applied to perform vertical orientation, and the ferromagnetic powder contained in the inner, yet undried, magnetic layer (namely, the lower magnetic layer) is orientated longitudinally by a weak magnetic field of 3,000 Oe or less, preferably 1,000 to 2,000 Oe, because the multilayer magnetic layer structure dries from the surface thereof (namely, the upper magnetic layer) in normal drying systems. To ensure such a scheme of orientation can be achieved, binders, such as polyurethane having a low weight-average molecular weight of 10,000 to 40,000 are used in the lower magnetic layer, and the polyurethane having a relatively high weight-average molecular weight of 30,000 to 70,000 is used in the upper magnetic layer, thereby allowing for adjusting the fixation of magnetic orientation between the magnetic layers.

When crosslinking agents such as polyisocyanates are used in this case, it is preferable that the amount of the functional groups of the resins contained in the upper and lower magnetic layers are pre-calculated and the amount of the crosslinking agents to be added is adjusted depending on appropriate degree and rate of hardening needed to allow orientation to be performed properly.

In the above-described step wherein the upper magnetic layer is dried and orientated by imposing the magnetic field, it is preferable to heat at 60° to 130° C. for 0.5 second to 5 minutes. In the orientation treatment of the lower magnetic layer, it is preferable to heat at 60° to 130° C. for 0.5 second to 5 minutes.

The binder compositions for the upper magnetic layer used in the above-mentioned second method include a resin composition containing 35 to 80% by weight of a vinyl chloride copolymer having a degree of polymerization of 250 to 350, preferably 270 to 330, and at least one polar group selected from the group consisting of $-SO_3M$, $-OSO_3M$, $-PO_3M_2$ and $-O-PO_3M_2$ (wherein M represents a hydrogen atom, an alkali metal or ammonium) in an amount of $1 \times 10^{-7}$ to $1 \times 10^{31}$ $^3$ equivalent/g of copolymer, 15 to 50% by weight of a polyurethane having a weight-average molecular weight of 30,000 to 70,000, and 15 to 50% by weight of a polyisocyanate. As the binder compositions for the lower magnetic layer, it is preferred to include unsaturated bond-containing compounds having a weight average molecular weight of 30,000 or less, such as vinyl chloride acrylates and other acrylates (for example, polyacrylates), at a weight ratio of 30:70 to 70:30.

By using the binders for the upper and lower magnetic layers having the above-described compositions, even when the upper and lower magnetic layers are simultaneously applied to form the magnetic layer structure, e.g., wet-on-wet, the acicular ferromagnetic powder contained in the lower magnetic layer can be orientated longitudinally and fixed without causing film hardening of the upper magnetic layer even on radiation exposure for film hardening of the lower magnetic layer, then the magnetic field is applied vertically to orientate the ferromagnetic alloy powder in the upper magnetic layer in the vertical direction, and thereafter the orientation can be fixed by heating to harden the upper magnetic layer.

In this case, it is preferred that radiation exposure is carried out to harden the lower magnetic layer during or after applying a magnetic field of 3,000 Oe or less longitudinally to the lower magnetic layer, and then the upper magnetic layer is heated to orientate the ferromagnetic alloy powder of the upper magnetic layer to 20,000 Oe or less vertically during or after applying a magnetic field in a range of from the intensity of the magnetic field for orientating the ferromagnetic powder of the lower magnetic layer.

As a suitable source of radiation in the above radiation treatment, there can be used electron beams, $\gamma$-rays, $\beta$-rays and ultraviolet rays. The electron beams are preferably used. The irradiation of the electron beams is carried out by using an electron beam accelerator.

When the electron beams are irradiated, the electron beams having an acceleration voltage of 100 to 500 kV, preferably 150 to 300 kV. The absorbed dose is generally 1.0 to 20 Mrads, preferably 2 to 10 Mrads.

After orientation treatment, the ferromagnetic alloy powder contained in the upper magnetic layer is heated at 30° to 130° C. for 0.5 seconds to 1 minute.

The magnetic recording media of the present invention may contain other various additives such as carbon black, fillers, abrasive agents, dispersing agents, antistatic agents, lubricating agents, in addition to the above-described ferromagnetic powders and binders compounds. It is preferred that the content of such various additives is lower than that of the binders.

As the above carbon black, known carbon black such as furnace black, coloring black or acetylene black can be arbitrarily used. Carbon black whose surface is partly grafted may be used. It is preferred that carbon black having an average particle size of about 30 to 1,000 nm is used. Fine-grained carbon black may be used in combination with coarse-grained carbon black.

There is no restriction on the above fillers. For example, it is possible to use granular fillers having average particle sizes ranging from 0.01 to 0.8 $\mu$m, preferably from 0.06 to 0.4 $\mu$m, which are usually employed. Examples of such fillers include particles of tungsten disulfide, calcium carbonate, titanium dioxide, magnesium oxide, zinc oxide, calcium oxide, lithopone and talc. They can be used alone or in combination.

As the above-described abrasive agents, materials generally used and having abrasive action or burnishing action are employed. From the viewpoint of the durability of the magnetic layers of the magnetic recording media, typical examples of the abrasive agents include fused alumina, $\alpha$-alumina, $\gamma$-alumina, $\alpha$-$\gamma$-alumina, silicon carbide, chromium oxide, cerium oxide, corundum, artificial diamond, $\alpha$-iron oxide, garnet, emery (main components: corundum and magnetite), silica, silicon nitride, boron nitride, molybdenum carbide, boron carbide, tungsten carbide, titanium carbide, quartz, tripoli, diatomaceous earth and dolomite. In particular, it is preferred that one to four kinds of abrasive agents having a Mohs' hardness of at least 6 are used in combination.

The abrasive agents having an average particle size of 0.005 to 5 microns are used, and particularly it is preferred that the size is 0.01 to 2 microns.

The dispersing agents include conventional dispersing agents such as fatty acids having 9 to 22 carbon atoms (such as caprylic acid, capric acid, lauric acid, myristic acid, palmitic acid, stearic acid, behenic acid, oleic acid, elaidic acid, linolic acid, linolenic acid and stearolic acid), metallic soaps composed of the above-described fatty acids and alkali metals (such as lithium, sodium and potassium) or alkaline earth metals (such as magnesium, calcium and barium), silane coupling agents, titanate coupling agents, aliphatic amines, higher alcohols, polyalkylene oxide alkyl phosphates, alkyl phosphates, alkyl borates, sarcosinates, alkyl ether esters, trialkylpolyolefinoxy quaternary ammonium salts and lecithin. When the dispersing agent is used, it is usually used in amounts ranging from 0.05 to 20 parts by weight per 100 parts by weight of the binder.

The antistatic agents include conductive fine powders such as carbon black graft polymers; natural surface active agents such as saponin; nonionic surface active agents such as alkylene oxide series, glycerol series and glycidol series surface active agents; cationic surface active agents such as higher alkylamines, quaternary ammonium salts, phosphonium salts and sulfonium salts; anionic surface active agents containing acidic groups such as carboxyl groups, sulfonic groups, phosphoric groups, sulfate groups and phosphate groups; and amphoteric surface active agents such as amino acids, aminosulfonic acids and sulfates or phosphates of aminoalcohols. When the above conductive fine powder is used as the antistatic agent, it is used, for example, in an amount of 0.2 to 20 parts by weight per 100 parts by weight of the binder. When the surface active agent is used, it is used in amounts ranging from 0.1 to 10 parts by weight.

The lubricating agents which can be used in the present invention include silicone oil, graphite, molybdenum disulfide, boron nitride, fluorinated graphite, fluorine- containing alcohols, polyolefins (such as polyethylene), polyglycols (such as polyethylene oxide wax), alkyl phosphates, polyphenyl ethers, tungsten disulfide, fatty acid esters of monobasic fatty acids having 10 to 20 carbon atoms and one or more of monovalent, divalent, trivalent, tetravalent, pentavalent and hexavalent alcohols having 3 to 12 carbon atoms, and fatty acid esters of monobasic fatty acids having at least 10 carbon atoms and monovalent to hexavalent alcohols, the sum of carbon atom numbers of the fatty acid and the alcohol being 8 to 22. Fatty acids having 8 to 22 carbon atoms, fatty acid amides and aliphatic alcohols may also be used. Specific examples of these organic lubricating agents include butyl caprylate, octyl caprylate, ethyl laurate, butyl laurate, octyl laurate, ethyl myristate, butyl myristate, octyl myristate, butyl palmitate, octyl palmitate, ethyl palmitate, butyl stearate, octyl stearate, amyl stearate, anhydrosorbitan monostearate, anhydrosorbitan distearate, anhydrosorbitan tristearate, anhydrosorbitan tetrastearate, oleyl alcohol and lauryl alcohol. Fluorine-substituted compounds may also be used. Further, so-called lubricating additives can also be used independently as the lubricating agents in the present invention. The lubricating agents include antioxidants (such as alkylphenols), rust-preventive agents (such as naphthenic acid, alkenylsuccinic acids and dilauryl phosphate), oiliness improvers (such as rapeseed oil and lauryl alcohol), extreme pressure agents (such as dibenzyl sulfide, tricresyl phosphate and tributyl phosphite), detergent-dispersants, viscosity index improvers, pour point depressants and antifoaming agents. These lubricating agents are added in amounts of 0.05 to 20 parts by weight per 100 parts by weight of binder.

There is no particular restriction on solvents used in kneading, and solvents usually employed for preparation of magnetic coatings can be used. Examples of the solvents include toluene, methyl ethyl ketone, methyl isobutyl ketone, cyclo hexanone and butyl acetate.

Methods for kneading are also not particularly limited, and the order of adding the components can be properly established.

Conventional kneading machines can be used for preparation of magnetic coatings. Examples of such kneading machines include two-roll mills, three-roll mills, ball mills, pebble mills, Trommel, sand grinders, Szegvari, attritors, high-speed impeller, dispersing devices, high-speed stone mills, high-speed impact mills, dispersers, kneaders, high-speed mixers, homogenizers and ultrasonic dispersing devices.

The above-described additives such as the dispersing agents, the antistatic agents and the lubricating agents are not described under the strict restriction that they have only the above effect. For example, the dispersing agent can also function as a lubricating agent or an antistatic agent. It is therefore understood of course that the effect and function of the above various additive compounds exemplified by the above classifications are not limited to the matters described in the above particular classification under which the additive was presented. When a material having plural effects and functions is used, its amount to be added is preferably determined considering its contribution of plural overall effects and functions thereof.

In addition, detergent-dispersants, viscosity index improvers, pour point depressants and antifoaming agents can be added.

The viscosity of the magnetic coatings thus prepared is usually within the range of 60 to 200 ps (poise).

Although it is possible to apply the magnetic coating directly to the surface of the above non-magnetic support, it is also possible to apply the magnetic coating to the surface of the support through an adhesive layer or directly to the surface of the support which has been physically treated (for example, by corona discharge treatment or electron beam irradiation treatment).

Examples of methods for applying the magnetic coating to the surface of the non-magnetic support include air doctor coating, blade coating, rod coating, extrusion coating, air knife coating, squeeze coating, impregnation coating, reverse roll coating, transfer roll coating, gravure coating, kiss coating, cast coating, spray coating bar coating and spin coating. Coating methods other than these methods can also be used. A simultaneous plural layer coating method (wet-on-wet coating method) may be employed.

It is preferred that the magnetic coating is applied so that the final overall thickness of the magnetic layers of the magnetic recording medium reaches 2 to 10 $\mu$m. In this case, the thickness of the upper magnetic layer is preferably within the range of 0.1 to 2 $\mu$m and the thickness of the lower magnetic layer is preferably within the range of 1 to 10 $\mu$m.

After coating and drying, surface smoothing treatment is conducted.

The surface smoothing treatment is performed by a calender treatment. Calender treatment include, for example, combinations of at least two steps, preferably at least three steps of rigid rolls and at least one elastic roll, and combinations of rigid rolls. Examples of these rigid rolls include various hard chrome plated or ceramic coated steel (metal) rolls having a center line surface roughness (Ra: cutoff value, 0.25 mm) of 20 nm or less, and more preferably of about 10 nm, and rolls whose surfaces are formed of super-hard alloy.

The calender treatment in the present invention can be generally carried out at the above-described temperature under a line pressure of 50 to 1,000 kg/cm, preferably of 50 to 350 kg/cm and a line speed of 20 to 400 m/min, preferably of 50 to 300 m/min.

The non-magnetic supports used in the present invention are not particularly limited. Supports generally employed can be used. Examples of materials forming the non-magnetic supports include films of various synthetic resins such as polyethylene terephthalate, polypropylene, polycarbonates, polyethylene naphthalate, polyamides, polyamideimides and polyimides; and foil of metals such as aluminum and stainless steel. Further, the thickness of the non-magnetic supports is also not particularly limited. In general, the thickness is 2.5 to 100 $\mu$m, and preferably 3 to 80 $\mu$m. The surface roughness (Ra: light interference type surface roughness) of the supports is 0.05 $\mu$m or less, preferably 0.02 $\mu$m or less, and more preferably 0.004 to 0.015 $\mu$m. In particular, when the supports having a surface roughness of 0.02 μm or less, which are excellent in surface smoothness are used, an excellent surface roughness effect can be achieved in the medium.

In the magnetic recording medium of the present invention having a plurality of magnetic layers, the upper magnetic layer contains the plate-like ferromagnetic alloy powder having the axis of easy magnetization vertically to the plate surface, and the lower magnetic layer contains the acicular ferromagnetic powder such as Co-containing iron oxide. Accordingly, the output is improved not only in the short wavelength region in which the recording wavelength is 1 μm or less and which is assigned to the upper magnetic layer, but also in the medium frequency region in which the wavelength is 1 to 4 μm and which is assigned to both the upper magnetic layer and the lower magnetic layer. As a result, the satisfactory electromagnetic characteristics can be obtained over the overall frequency band.

The present invention will be described in more detail by reference to the following examples. It is readily understood by those skilled in the art that the components, the ratios, the order of operations and the like shown here can be changed without departing from the spirit of present invention and within the scope thereof. The present invention, therefore, should not be considered as limited to the following examples. All parts are by weight in the examples and comparative examples.

EXAMPLE 1

Magnetic coating solutions for lower and upper layers having the following compositions were prepared:

| A: Magnetic Coating Solution for Lower Magnetic Layer | |
|---|---|
| Acicular ferromagnetic powder (described in Table 1A) | 100 parts |
| Vinyl chloride resin (MR110 (trade name), manufactured by Nippon Zeon Co, Ltd., degree of polymerization: 310) | 10 parts |
| Polyurethane resin (polyester polyurethane, weight-average molecular weight: 30,000) | 6 parts |
| Polyisocyanate compound (Coronate L) | 5 parts |
| Carbon black (average particle size: 28 nm, oil absorption: 180 ml/100 g) | 5 parts |
| α-Al$_2$O$_3$ (average particle size: 200 nm) | 10 parts |
| Stearic acid | 2 parts |
| Butyl stearate | 2 parts |
| Methyl ethyl ketone | 250 parts |
| Cyclohexanone | 250 parts |
| A: Magnetic Coating Solution for Upper Magnetic Layer | |
| Ferromagnetic alloy powder (described in Table 1A) | 100 parts |
| Vinyl chloride resin (MR110 (trade name), manufactured by Nippon Zeon Co, Ltd., degree of polymerization: 310) | 10 parts |
| Polyurethane resin (polyester polyurethane, weight-average molecular weight: 60,000) | 6 parts |
| Polyisocyanate compound (Coronate L) | 5 parts |
| Carbon black (average particle size: 28 nm, oil absorption: 180 ml/100 g) | 5 parts |
| α-Al$_2$O$_3$ (average particle size: 200 nm) | 10 parts |
| Stearic acid | 2 parts |
| Butyl stearate | 2 parts |
| Methyl ethyl ketone | 250 parts |
| Cyclohexanone | 250 parts |

The above-described coating solutions for upper and lower magnetic layers were applied to a polyethylene terephthalate support by the simultaneous wet-on-wet plural coating method (coating speed: 80 m/min) so as to form an upper magnetic layer having a thickness of 0.7 μm and a lower magnetic layer having a thickness of 2.5 μm after drying. For orientation, the layers were first dried at 50° C. for 3 seconds while applying a magnetic field of 10,000 Oe vertically, and then dried at 70° C. for 3 seconds while applying a magnetic field of 2,000 Oe longitudinally.

After drying, calender treatment was conducted, followed by slitting to a width of 8 mm to produce a tape for 8-mm video tape recorders.

The calender treatment was carried out by using three step metal rolls (Ra: 10 nm, cutoff value: 0.25 mm) at a roll temperature of 90° C. under a line pressure of 260 kg/cm. The reproduced output was measured by running the tapes thus obtained.

The results are shown in Table 1A.

EXAMPLE 2

| B: Magnetic Coating Solution for Lower Magnetic Layer | |
|---|---|
| Acicular ferromagnetic powder (described in Table 1B) | 100 parts |
| Vinyl chloride ccpolymer series acrylate (acid value: 3, weight-average molecular weight: 20,000, average content of acryloyl groups: 2.8 groups/molecule) | 10 parts |
| Polyurethane acrylate (acid value: 1.8, weight-average molecular weight: 10,000, average content of acryloyl groups: 3 groups/molecule) | 6 parts |
| Trimethylolpropane triacrylate | 5 parts |
| Carbon black (average particle size: 28 nm, oil absorption: 180 ml/100 g) | 5 parts |
| α-Al$_2$O$_3$ (average particle size: 200 nm) | 10 parts |
| Stearic acid | 2 parts |
| Butyl stearate | 2 parts |
| Methyl ethyl ketone | 250 parts |
| Cyclohexanone | 250 parts |
| B: Magnetic Coating Solution for Upper Magnetic Layer | |
| Ferromagnetic alloy powder (described in Table 1B) | 100 parts |
| Vinyl chloride resin (MR110 (trade name), manufactured by Nippon Zeon Co, Ltd., degree of polymerization: 310) | 10 parts |
| Polyurethane resin (polyester polyurethane, weight-average molecular weight: 60,000) | 6 parts |
| Polyisocyanate compound (Coronate L) | 5 parts |
| Carbon black (average particle size: 28 nm, oil absorption: 180 ml/100 g) | 5 parts |
| α-Al$_2$O$_3$ (average particle size: 200 nm) | 10 parts |
| Stearic acid | 2 parts |
| Butyl stearate | 2 parts |
| Methyl ethyl ketone | 250 parts |
| Cyclohexanone | 250 parts |

The above-described coating solutions for the upper end lower magnetic layers were applied to a polyethylene terephthalate support by the simultaneous wet-on-wet plural coating method (coating speed: 80 m/min) so as to form an upper magnetic layer having a thickness of 0.7 μm and a lower magnetic layer having a thickness of 2.5 μm after drying.

After coating, a magnetic field of 2,000 Oe was applied longitudinally while the magnetic layers wee in a wet condition. Subsequently, electron beam irradiation treatment (acceleration voltage: 200 kV, irradiation dose: 5 Mrads, irradiation atmosphere temperature: 50° C., oxygen concentration: 10 ppm) was conducted.

Further, the magnetic layers were dried at 70° C. for 3 seconds while applying a magnetic field of 10,000 Oe vertically.

Then, a calender treatment was conducted, followed by slitting to a width of 8 mm to produce a tape for 8-mm video tape recorders.

The calender treatment was carried out by using three step metal rolls (Ra: 10 nm, cutoff value: 0.25 mm) at a roll temperature of 90° C. under a line pressure of 260 kg/cm. The reproduced output was measured by running the tapes thus obtained.

The results are shown in Table 1B.

Measuring Method of Reproduced Output

By using a commercial 8-mm video tape recorder (Fujix-8 manufactured by Fuji Photo Film Co., Ltd.), a 7-MHz single wave signal was recorded on a tape.

A b 7-MHz reproduced output obtained by reproducing this signal was measured by using an output level meter.

The values of the output shown in Tables are values when the value of a commercial 8-mm video tape (Fuji Super HG P6-120) is taken as 0 dB.

The output at 3 MHz and 0.75 MHz was also measured in a similar manner.

TABLE 1A

| Sample No. | Ferromagnetic powder | | | | |
|---|---|---|---|---|---|
| | Kind | Shape | Plate or Acicular Ratio | Hc (Oe) | σs (emu/g) | Br (gauss) |

| Sample No. | Kind | Shape | Plate or Acicular Ratio | Hc (Oe) | σs (emu/g) | Br (gauss) |
|---|---|---|---|---|---|---|
| Upper Magnetic Layer | | | | | | |
| A-1 | Ba-ferrite | Plate-like | Plate ratio = 5 | 1500 | 58 | 1300 |
| A-2 | Co—Ni (5%) alloy | Plate-like | Plate ratio = 3 | 1500 | 110 | 2100 |
| A-3 | Sm—Co5 alloy | Plate-like | Plate ratio = 2 | 3000 | 100 | 2000 |
| A-4 | Fe—Nd—B alloy | Plate-like | Plate ratio = 4 | 2800 | 130 | 3000 |
| A-5 | Co—Ni (5%) alloy | Plate-like | Plate ratio = 2 | 1100 | 110 | 2100 |
| A-6 | Co—Ni (5%) alloy | Plate-like | Plate ratio = 3 | 1500 | 110 | 2100 |
| A-7 | Co—Ni (5%) alloy | Plate-like | Plate ratio = 5 | 2200 | 110 | 2100 |
| A-8 | Co-coated γ-Fe2O3 | Acicular | Acicular ratio = 9 | 900 | 69 | 1700 |
| A-9 | Fe—Ni (10%) alloy | Acicular | Acicular ratio = 8 | 1550 | 130 | 3200 |
| Lower Magnetic Layer | | | | | | |
| A-1 | Co-coated γ-Fe2O3 | Acicular | Acicular ratio = 9 | 900 | 69 | 1700 |
| A-2 | Co-coated γ-Fe2O3 | Acicular | Acicular ratio = 9 | 900 | 69 | 1700 |
| A-3 | Co-coated γ-Fe2O3 | Acicular | Acicular ratio = 9 | 900 | 69 | 1700 |
| A-4 | Fe—Ni (35%) alloy | Acicular | Acicular ratio = 6 | 850 | 69 | 2900 |
| A-5 | Co-coated γ-Fe2O3 | Acicular | Acicular ratio = 9 | 700 | 69 | 1700 |
| A-6 | none | — | — | — | — | — |
| A-7 | Co-coated γ-Fe2O3 | Acicular | Acicular ratio = 9 | 900 | 69 | 1700 |
| A-8 | none | — | — | — | — | — |
| A-9 | Co-coated γ-Fe2O3 | Acicular | Acicular ratio = 9 | 900 | 69 | 1700 |

TABLE 1A-continued

| Sample No. | Reproduced Output (dB) | | |
|---|---|---|---|
| | 0.75 MHz | 3 MHz | 7 MHz |
| A-1 | 2.0 | −0.3 | −0.3 |
| A-2 | 3.0 | 1.3 | 2.7 |
| A-3 | 2.7 | 0.8 | 4.0 |
| A-4 | 3.2 | 2.0 | 4.8 |
| A-5 | 3.4 | 1.6 | 1.8 |
| A-6 | −4.0 | 2.0 | 2.8 |
| A-7 | 3.0 | 0.5 | 3.0 |
| A-8 | 2.8 | −3.2 | −5.3 |
| A-9 | 3.0 | 1.0 | 0.0 |

TABLE 1B

| Sample No. | Kind | Shape | Plate or Acicular Ratio | Hc (Oe) | σs (emu/g) | Br (gauss) |
|---|---|---|---|---|---|---|
| Upper Magnetic Layer | | | | | | |
| B-1 | Ba-ferrite | Plate-like | Plate ratio = 5 | 1500 | 58 | 1300 |
| B-2 | Co—Ni (5%) alloy | Plate-like | Plate ratio = 3 | 1500 | 110 | 2100 |
| B-3 | Sm—Co5 alloy | Plate-like | Plate ratio = 2 | 3000 | 100 | 2000 |
| B-4 | Fe—Nd—B alloy | Plate-like | Plate ratio = 4 | 2000 | 130 | 3000 |
| B-5 | Co—Ni (5%) alloy | Plate-like | Plate ratio = 2 | 1100 | 110 | 2100 |
| B-6 | Co—Cr (5%) alloy | Plate-like | Plate ratio = 5 | 2200 | 110 | 2100 |
| B-7 | Fe—Ni (10%) alloy | Acicular | Acicular ratio = 8 | 1550 | 130 | 3200 |
| Lower Magnetic Layer | | | | | | |
| B-1 | Co-coated γ-Fe2O3 | Acicular | Acicular ratio = 9 | 900 | 69 | 1700 |
| B-2 | Co-coated γ-Fe2O3 | Acicular | Acicular ratio = 9 | 900 | 69 | 1700 |
| B-3 | Co-coated γ-Fe2O3 | Acicular | Acicular ratio = 9 | 900 | 69 | 1700 |
| B-4 | Fe—Ni (35%) alloy | Acicular | Acicular ratio = 6 | 850 | 130 | 2900 |
| B-5 | Co-coated γ-Fe2O3 | Acicular | Acicular ratio = 9 | 700 | 69 | 1700 |
| B-6 | Co-coated γ-Fe2O3 | Acicular | Acicular ratio = 9 | 900 | 69 | 1700 |
| B-7 | Co-coated γ-Fe2O3 | Acicular | Acicular ratio = 9 | 900 | 69 | 1700 |

| Sample No. | Reproduced Output (dB) | | |
|---|---|---|---|
| | 0.75 MHz | 3 MHz | 7 MHz |
| B-1 | 2.0 | −0.3 | −0.3 |
| B-2 | 3.0 | 1.3 | 2.7 |
| B-3 | 2.7 | 0.8 | 4.0 |
| B-4 | 3.2 | 2.0 | 4.8 |
| B-5 | 3.4 | 1.6 | 1.8 |
| B-6 | 3.0 | 0.5 | 3.0 |
| B-7 | 3.0 | 1.0 | 0.0 |

As apparent from the results shown in Table 1A, samples A-2 to A-5 and A-7 of the present invention were high in reproduced output at a high frequency of 7 MHz and at 3 MHz, and also high in reproduced output at 0.75 MHz. Thus, the reproduced output was significantly improved.

On the other hand, sample A-1 in which Ba-Fe was used in the upper magnetic layer was improved in reproduced output somewhat at 0.75 MHz, but the improvement was insufficient even at that frequency. As to samples A-6 and A-8 each of which had the single magnetic layer, the output at 3 MHz could not be sufficiently obtained. Also, when the acicular ferromagnetic alloy powder was used in the upper magnetic layer (sample A-9), the reproduced output at 7 MHz could not be sufficiently obtained. In samples B-1 to B-7 using the radiation curable binders, the same tendencies as observed with samples A-1 to A-9 was observed.

While the invention has been described in detail and with reference to specific embodiments thereof, it will be apparent to one skilled in the art that various changes and modifications can be made therein without departing from the spirit and scope thereof.

What is claimed is:

1. A magnetic recording medium comprising at least two magnetic layers each containing at least one ferromagnetic powder dispersed in a binder, wherein said medium comprises a lower magnetic layer having a residual magnetic flux density of 1,200 to 3,500 gausses and containing an acicular ferromagnetic powder having a coercive force of 600 to 2,000 Oe, and an upper magnetic layer having a residual magnetic flux density of 2,000 to 3,500 gausses and containing a plate-shaped ferromagnetic alloy powder having a coercive force of 1,000 to 5,000 Oe, a saturation magnetization of 90 to 150 emu/g and an axis of easy magnetization vertical to a plate surface.

2. The magnetic recording medium as in claim 1, wherein at least one of said upper and lower magnetic layers contains a binder which is a vinyl chloride copolymer having a degree of polymerization of 250 to 350 and containing at least one polar group selected from the group consisting of $-SO_3M$, $-OSO_3M$, $-PO_3M_2$ and $-OPO_3M_2$ wherein M represents a hydrogen atom, an alkali metal or ammonium.

3. The magnetic recording medium as in claim 1, wherein said plate-shaped ferromagnetic alloy powder has a plate ratio $\phi/t \geq 1$, wherein $\phi$ represents a grain size of 0.5 $\mu$m or less and t represents a plate thickness of 0.5 $\mu$m or less, and said plate-like ferromagnetic alloy powder has a specific surface area ($S_{BET}$) of 20 m$^2$/g or more.

4. The magnetic recording medium as in claim 1, wherein said acicular ferromagnetic powder has an acicular ratio of 3 to 15 and a length in a long axis of 0.5 $\mu$m or less and specific surface area ($S_{BET}$) of 25 m$^2$/g or more.

5. The magnetic recording medium as in claim 1, wherein said acicular ferromagnetic powder contained in said lower magnetic layer has been magnetically oriented longitudinally and said plate-shaped ferromagnetic alloy powder in said upper magnetic layer has been magnetically oriented vertically.

6. The magnetic recording medium as in claim 1, wherein said acicular ferromagnetic powder has an acicular ratio of from 3 to 15.

7. A method for producing a magnetic recording medium which comprises applying a first magnetic coating containing an acicular ferromagnetic powder having a coercive force of 600 to 2,000 Oe and a polyurethane binder having a weight-average molecular weight of 10,000 to 40,000 to form a lower magnetic layer; applying a second magnetic coating to said lower magnetic layer simultaneously with or subsequent to formation of said lower layer to form an upper magnetic layer, and said second magnetic coating containing a plate-shaped ferromagnetic alloy powder having a coercive force of 1,000 to 5,000 Oe, a saturation magnetization of 90 to 150 emu/g and an axis of easy magnetization vertically to a plate surface, a vinyl chloride copolymer having a degree of polymerization as low as 250 to 350 and containing at least one polar group selected from the group consisting of $-SO_3M$, $-OSO_3M$, $-PO_3M_2$ and $-OPO_3M_2$ (wherein M represents a hydrogen atom, an alkali metal or ammonium) and a polyurethane having a weight-average molecular weight of 30,000 to 70,000; then vertically orientating the ferromagnetic alloy powder contained in the upper magnetic layer by applying a magnetic field of 3,000 to 20,000 Oe vertically thereto; and thereafter orientating the acicular ferromagnetic powder contained in the lower magnetic layer longitudinally by applying a magnetic field of 3,000 Oe or less longitudinally thereto.

8. A method for producing a magnetic recording medium which comprises applying a first magnetic coating containing an acicular ferromagnetic powder having a coercive force of 600 to 2,000 Oe and an unsaturated bond-containing compound as a binder to form a lower magnetic layer, said unsaturated bond-containing compound being crosslinkable or polymerizable by radiation exposure and having a weight-average molecular weight of 30,000 or less; applying a second magnetic coating to said lower magnetic layer simultaneously with or subsequent to formation of said lower layer to form an upper magnetic layer, and said second magnetic coating containing a plate-shaped ferromagnetic alloy powder having a coercive force of 1,000 to 5,000 Oe, a saturation magnetization of 90 to 150 emu/g and an axis of easy magnetization vertically to a plate surface, a vinyl chloride copolymer having a degree of polymerization as low as 250 to 350 and at least one polar group selected from the group consisting of $-SO_3M$, $-OSO_3M$, $-PO_3M_2$ and $-OPO_3M_2$ (wherein M represents a hydrogen atom, an alkali metal or ammonium) and a polyurethane having a weight-average molecular weight of 30,000 to 70,000; then hardening the lower magnetic layer by radiation exposure during or after applying a magnetic field of 3,000 Oe or less longitudinally; and thereafter heating the upper magnetic layer during or after applying a magnetic field in a range of from the intensity of the magnetic field applied to said lower magnetic layer to 20,000 Oe or less to orientate and harden said ferromagnetic alloy powder vertically.

* * * * *